Sept. 17, 1968     F. RIENKS ET AL     3,401,859
LOW FRICTION WIRE SUPPORT FOR CONSUMABLE ELECTRODE TORCH
Filed Jan. 27, 1966     3 Sheets-Sheet 2

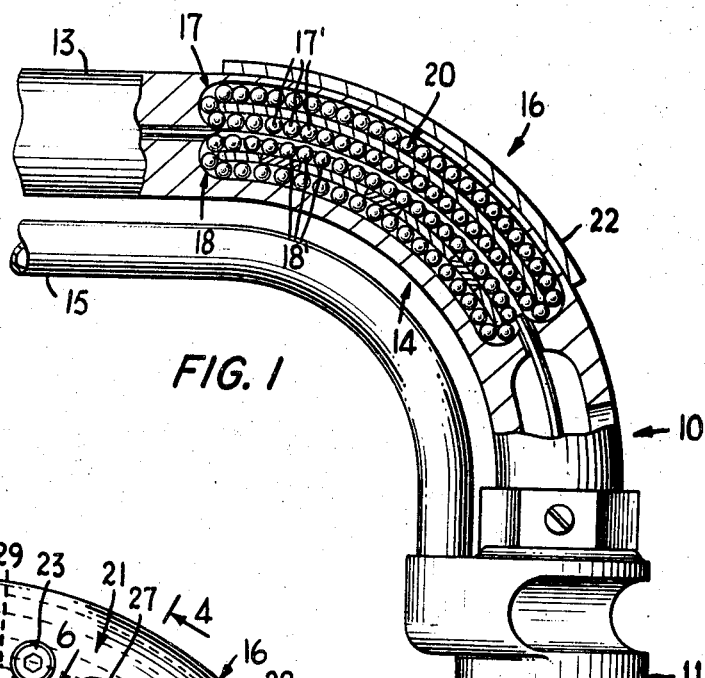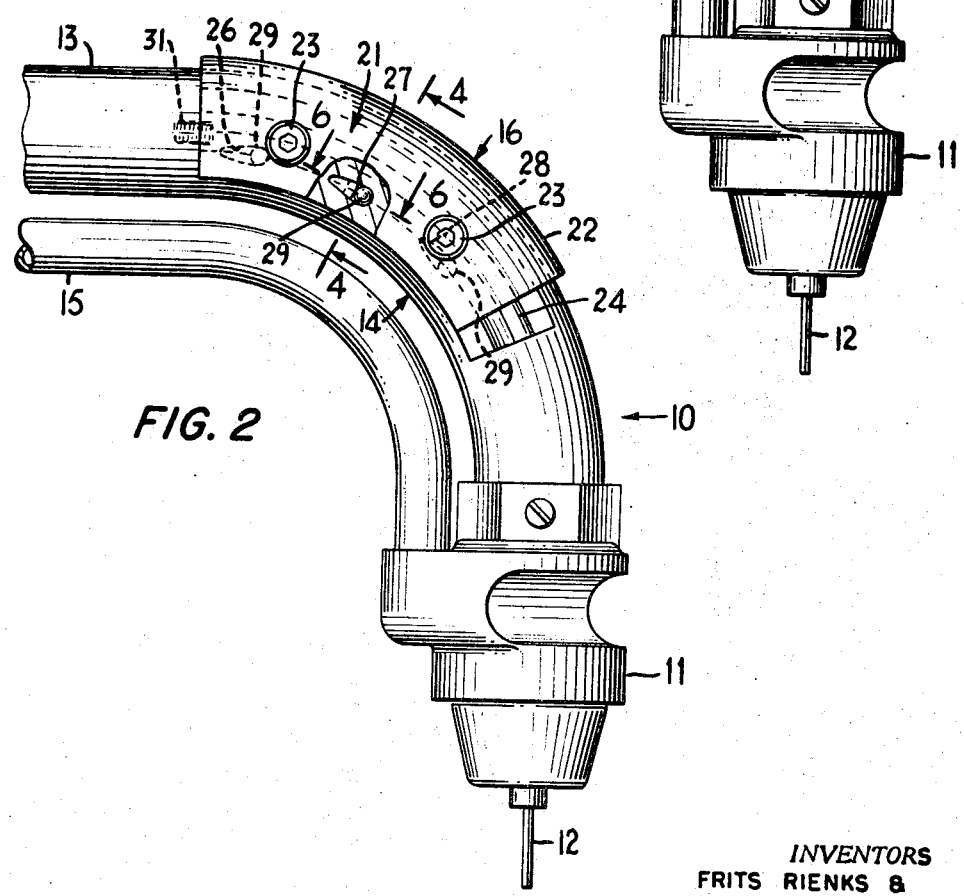

INVENTORS
FRITS RIENKS &
REINHOLD KOCH their ATTORNEYS

United States Patent Office 3,401,859
Patented Sept. 17, 1968

3,401,859
LOW FRICTION WIRE SUPPORT FOR
CONSUMABLE ELECTRODE TORCH
Frits Rienks, Groton, and Reinhold Koch, Old Saybrook,
Conn., assignors to General Dynamics Corporation,
New York, N.Y., a corporation of Delaware
Filed Jan. 27, 1966, Ser. No. 523,322
5 Claims. (Cl. 226—196)

ABSTRACT OF THE DISCLOSURE

In the particular embodiments of the invention described herein, a guide for directing wire through the curved neck of a consumable electrode welding torch includes three sets of recirculating balls disposed along the curved portion of the wire path in angularly equidistant relation. In one embodiment, two of the sets are movable toward and away from each other and from the path of the wire by motion of a sleeve surrounding the sets, the sleeve being urged by a spring in the direction causing the sets to move together.

The present invention relates to devices for transferring wire from one point to another and, more particularly, to a novel arrangement for feeding welding wire through welding torches.

Most currently available consumable electrode welding torches incorporate a torch neck having a fairly large radius through which the welding wire is fed. Miniaturizing the torch, as is required for welding in confined areas, involves, in most cases, the feeding of standard wire diameters through much smaller torch neck radii. The smaller torch neck radius causes a disproportionately large increase in the frictional resistance encountered by the wire and this frictional resistance causes nonuniform wire feeding and frequently causes heating of components which subsequently require forced cooling.

In addition, the presently existing torches require the stocking of a number of different torch parts to accommodate different wire sizes, and the rather time-consuming changeover operation required for welding with a different wire size usually involves a partial dismantling of the torch to insert a wire guide of the correct diameter. In addition, none of the commercially available torches adjust automatically for wear of the component parts.

Accordingly, it is an object of the present invention to provide a new and improved low friction, precise support for wire which has to be guided through small radius curvatures.

Another object of the invention is to provide a wire guide of the above character having stepless and automatic adjustment to accommodate different wire diameters.

A further object of the invention is to provide a torch, including a wire guide of the above character, which adjusts automatically to compensate for wear of the low friction components thereof.

These and other objects of the invention are obtained by providing a wire guide including a plurality of recirculating antifriction elements disposed in relation to one another so as to form a path for wire. In a preferred embodiment, the wire guide is arranged to accommodate wires of various sizes and includes movable supports for a plurality of sets of recirculating antifriction elements. The wire guide of the invention is especially useful in a consumable electrode welding torch in which a spring bias is provided for urging the movable supports to a position wherein the recirculating antifriction elements engage and support a wire disposed in the path.

Further objects and advantages of the invention will be apparent from a reading of the following description in conjunction with the accompanying drawings, in which:

FIGURE 1 is a side view, partially broken away, illustrating a representative welding torch embodying the invention;

FIGURE 2 is a side view similar to that of FIGURE 1, partially broken away to illustrate the adjusting arrangement for accommodating different wire sizes;

Figure 3:
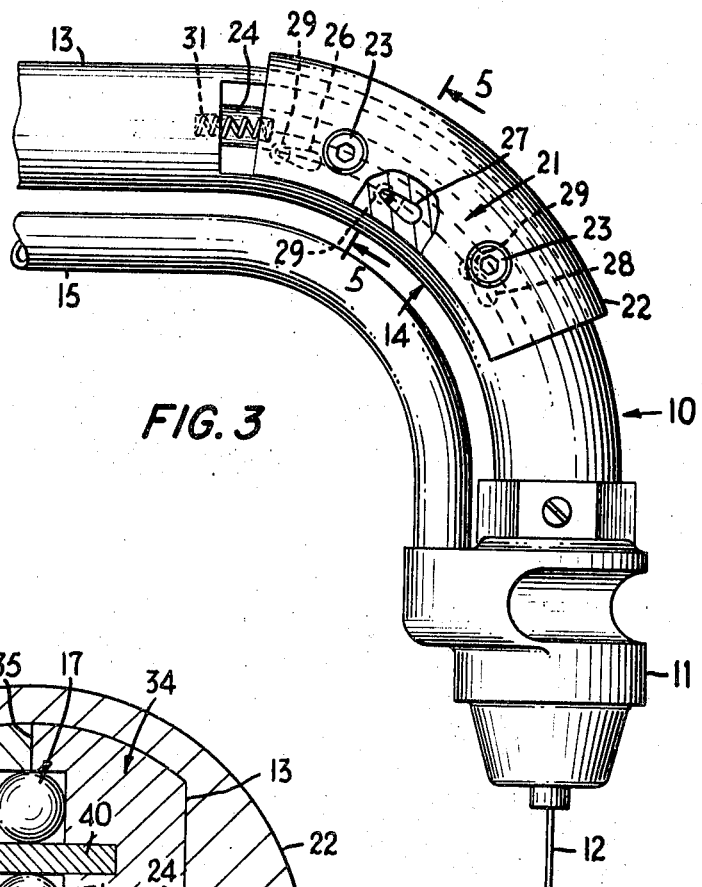
FIGURE 3 is a side view similar to that of FIGURE 2, showing the position of the adjustment arrangement with a smaller wire in the welding torch.

The typical welding torch 10 arranged according to the invention, as shown in FIGURES 1 and 2, includes a nozzle 11 to which a consumable wire electrode 12 is supplied through a conduit 13 having a curved section 14. In addition, the torch 10 includes a gas supply tube 15 for conducting an inert gas to the nozzle 11 in the usual manner.

Figure 4:
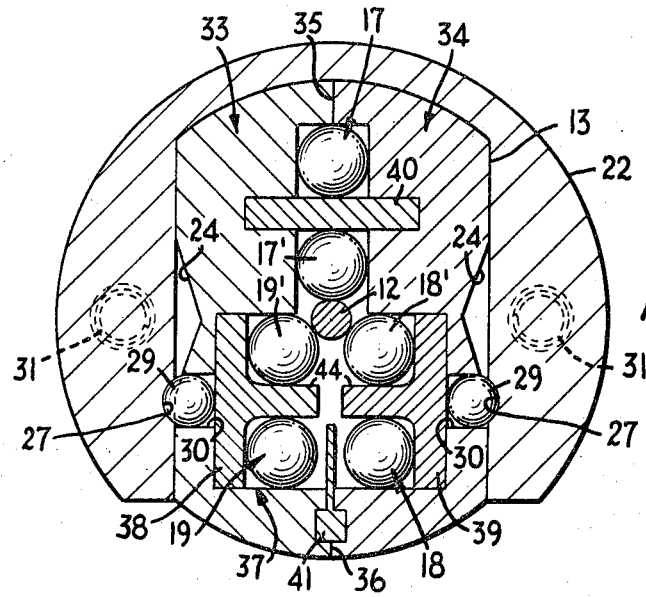
FIGURE 4 is an enlarged cross-sectional view taken along the line 4—4 of FIGURE 2 and looking in the direction of the arrows.
Figure 5:
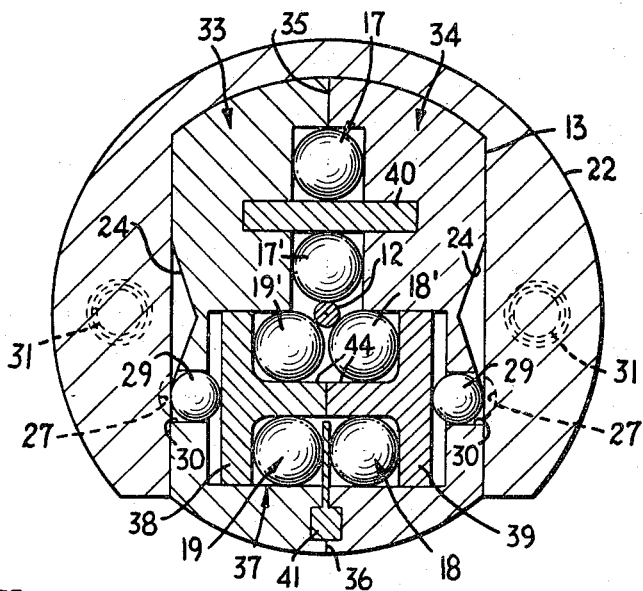
FIGURE 5 is an enlarged cross-sectional view taken along the line 5—5 of FIGURE 3.
Figure 6:
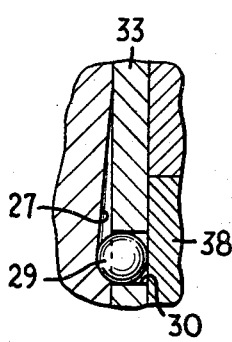
FIGURE 6 is an enlarged fragmentary, sectional view taken along the line 6—6 of FIGURE 2 illustrating a portion of the adjusting arrangement.

Within the curved section 14 a wire guide 16 includes three sets of recirculating steel balls; two of these sets can be seen in FIGURE 1 and are numbered 17 and 18; the third set, 19, of recirculating steel balls is not shown in FIGURE 1, being in a portion of the wire guide 16 that was cut away, but is indicated in the sectional views of FIGURES 4 and 5. For the sake of clarity, the individual balls of each set which engage the wire 12 are designated 17', 18' and 19', respectively. Each of these sets includes a continuous path 20 for the steel balls which is substantially co-extensive in length with the curved section 14 of the torch 10 so as to permit the recirculating balls to guide the wire throughout the curved section. It will be noted that the sets of recirculating steel balls are disposed parallel to the consumable electrode wire 12 and in positions whereby individual balls engage the wire at many points throughout the length of the sets. Also, as best seen in the cross-sectional views of FIGURES 4 and 5, the individual steels balls 17', 18' and 19' are disposed about the path of the wire 12 so as to engage the wire at angularly spaced-apart positions. These positions are preferably approximately equidistant from each other.

In order to accommodate different wire sizes and to permit the radial positions of the recirculating balls to adjust automatically for wear, the wire guide includes an adjusting arrangement 21. This adjusting arrangement, as shown in FIGURES 2 and 4–6, includes a slidable housing 22 surrounding the conduit 13, held in position by four set screws 23 which enter corresponding V-shaped grooves 24 extending along the sides of the conduit and the set screws being slidable therein. Along the inside of the housing, three tapered grooves 26, 27 and 28 are formed on each side of the conduit, and a ball 29 is supported in a hole 30 in the conduit adjacent to each groove. Two springs 31 located in the conduit at the end remote from the nozzle 11 urge the housing 22 along the curved section toward the nozzle, the set screws 23 being effective to guide the housing in its movement around the curved section.

As shown in FIGURES 4 and 5, the conduit 13 consists of two supporting members 33 and 34. These members engage each other at their extreme ends 35 and 36 and are so contoured as to define a cavity 37 of T-shaped cross-section. The cavity encloses the three sets of recirculating steel balls, 17, 18 and 19, surrounding the consumable electrode wire 12, and has two movable ball supports 38 and 39, and two fixed ball supports 40 and 41. The fixed support 40 separates the two passages of the closed loop path 20 for the set of balls 17 and the movable supports 38 and 39 have projections 44 which serve the same purpose for the sets 18 and 19. The fixed support 41 keeps the balls of the sets 18 and 19 separated. To permit adjustment, the movable supports are urged inwardly toward the center of the cavity by the balls 29 in cooperation with the three grooves 26, 27 and 28 and the springs 31. Consequently, the effect of the springs urging the slidable housing 22 toward the nozzles is to make certain that the recirculating balls 17′, 18′ and 19′ engage and support the wire 12 at all times regardless of the wire diameter or wearing of the parts.

In operation, the slidable housing 22 is pulled back to the remote end position shown in FIGURE 2, and the consumable electrode wire 12 is fed into the wire guide 16 from the remote end of the conduit 13. When the housing is subsequently released, the resilient force exerted by the springs 31 moves the housing forwardly toward the nozzle 11 of the torch 10. As the housing slides in that direction, the tapered grooves 26, 27 and 28 force the balls 29 toward the interior of the conduit 13 so that they press the movable supports 38 and 39 toward each other. Those supports, in turn, urge the recirculating balls 17′, 18′ and 19′ to a position wherein they engage and support the consumable electrode wire 12.

The following examples may be of aid in appreciating the operation of the welding torch. When a large diameter wire is within the wire guide 16, as shown in FIGURES 2 and 4, the housing 22 will slide only a small distance toward the nozzle of the torch 10 before the tapered grooves have pushed the balls 29, the movable supports 38 and 39, and the recirculating balls 17′, 18′ and 19′ to a position wherein the recirculating balls engage the wire 12. When a small diameter wire is within the wire guide as shown in FIGURES 3 and 5, the housing slides farther down toward the nozzle of the torch before the tapered grooves have pushed the balls 29, movable supports and the recirculating balls to a position wherein the latter balls engage the wire.

Figure 7:
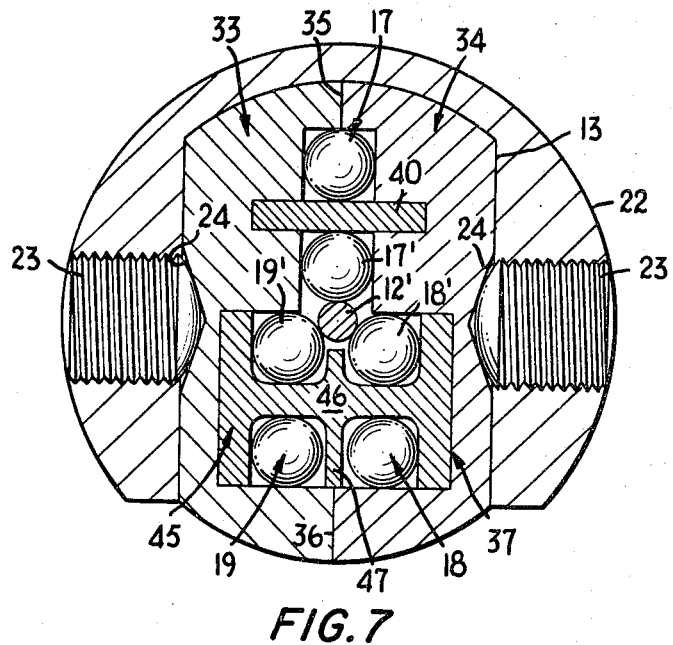
FIGURE 7 is an enlarged cross-sectional view similar to that of FIGURES 4 and 5, showing another form of wire guide according to the invention.

Another embodiment of the invention, which is not adjustable to receive different wire diameters, is shown in FIGURE 7. The structure shown in FIGURE 7 is similar to that shown in FIGURES 4 and 5, except that since there is no adjustment feature, the springs 31, the tapered grooves 26, 27 and 28, and the ball supports 29 of FIGURES 4 and 5 are eliminated. Replacing the movable supports 38 and 39 and the fixed support 41 of FIGURES 4 and 5 is the fixed support 45 whose horizontal projection 46 separates the two passages of the closed loop 20 for the sets of balls 18 and 19 and whose vertical projection 47 separates the balls of the sets 18 and 19 from each other. As the embodiment shown in FIGURE 7 has no adjusting feature, the recirculating balls 17′, 18′ and 19′ are always spaced the same distance apart from each other, and as such engage and support a wire of only one diameter.

It will be understood by those skilled in the art that the above-described embodiments are meant to be merely exemplary in that they are susceptible of modification and variation without departing from the spirit and scope of the invention. For example, the adjustable embodiment of the invention has been illustrated using two movable ball supports but adjustment of the position of the recirculating antifriction steel balls could also be accomplished with only one movable ball support. Further, the recirculating, antifriction balls could be formed from plastic, fiberglass, metal alloy, ceramic, or any other suitable material out of which balls can be manufactured. Still further, the device could be modified to use rollers instead of balls or a combination of both. Therefore, all such variations and modifications are included within the scope of the invention as set forth in the appended claims.

We claim:

1. A wire guide for a welding torch comprising guide means forming a curved path for feeding wires of various sizes to the nozzle of a welding torch, and a plurality of sets of recirculating antifriction elements disposed within the guide means and adjacent to the path so as to guide the wire toward the nozzle with reduced frictional resistance, at least one set of recirculating antifriction elements being disposed radially outwardly of the curved path to cause a wire to follow the curved path.

2. A wire guide as recited in claim 1 including three sets of elements disposed approximately angularly equidistant about the path forming the guide means.

3. A wire guide for a welding torch comprising guide means forming a curved path for feeding wires of various sizes to the nozzle of the welding torch, at least two pluralities of sets of recirculating antifriction elements disposed longitudinally of the guide means and adjacent to the path so as to engage and guide a wire toward the nozzle with reduced frictional resistance, and movable support means permitting motion of at least one set of recirculating antifriction elements toward and away from the path formed by the guide means.

4. A wire guide as recited in claim 3 including means for urging at least one of the sets of recirculating antifriction elements toward the wire path.

5. A wire guide as recited in claim 4 wherein the urging means includes a slidable housing surrounding the recirculating antifriction elements and at least one tapered member responsive to the movement of the slidable housing to drive the movable support means.

References Cited

UNITED STATES PATENTS

| 1,552,161 | 9/1925 | Houghton | 254—190 |
| 2,286,140 | 6/1942 | Klein | 242—157 |

FOREIGN PATENTS 712,282   10/1941   Germany.

M. HENSON WOOD, Jr., *Primary Examiner.*

R. A. SCHACHER, *Assistant Examiner.*